(12) United States Patent
Abotabl et al.

(10) Patent No.: US 12,362,883 B2
(45) Date of Patent: Jul. 15, 2025

(54) CHANNEL STATE INFORMATION PROCESSING PARAMETERS FOR DYNAMIC NETWORK ENTITY POWER ADAPTATION

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/809,954

(22) Filed: Jun. 30, 2022

(65) Prior Publication Data

US 2024/0007253 A1    Jan. 4, 2024

(51) Int. Cl.
*H04W 4/00* (2018.01)
*H04L 5/00* (2006.01)

(52) U.S. Cl.
CPC .................... *H04L 5/0053* (2013.01)

(58) Field of Classification Search
CPC .... H04L 5/0053; H04L 5/0048; H04L 5/0057

USPC .................................... 370/329, 330
See application file for complete search history.

(56) References Cited

U.S. PATENT DOCUMENTS

| | | | | |
|---|---|---|---|---|
| 2022/0271814 A1* | 8/2022 | Hao | ...................... | H04B 7/0456 |
| 2022/0278802 A1* | 9/2022 | Noh | ...................... | H04B 7/06 |
| 2022/0360309 A1* | 11/2022 | Long | ...................... | H04B 17/336 |
| 2023/0052478 A1* | 2/2023 | Ren | ...................... | H04B 7/088 |
| 2023/0122910 A1* | 4/2023 | Li | ...................... | H04L 1/0026 370/329 |
| 2023/0370137 A1* | 11/2023 | Ly | ...................... | H04L 5/0051 |
| 2024/0214947 A1* | 6/2024 | Park | ...................... | H04L 5/0053 |

* cited by examiner

*Primary Examiner* — Chuong T Ho
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive, from a network entity, a channel state information (CSI) report configuration including multiple CSI reference signal (CSI-RS) transmit power configurations. The UE may transmit, to the network entity, the CSI report, wherein the CSI report is associated with at least one CSI processing parameter that is based at least in part on the multiple CSI-RS transmit power configurations. Numerous other aspects are described.

30 Claims, 10 Drawing Sheets

CHANNEL STATE INFORMATION PROCESSING PARAMETERS FOR DYNAMIC NETWORK ENTITY POWER ADAPTATION

FIELD OF THE DISCLOSURE

Aspects of the present disclosure generally relate to wireless communication and to techniques and apparatuses for channel state information processing parameters for dynamic network entity power adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a channel state information (CSI) report configuration including multiple CSI reference signal (CSI-RS) transmit power configurations. The method may include transmitting, to the network entity, the CSI report, wherein the CSI report is associated with at least one CSI processing parameter that is based at least in part on the multiple CSI-RS transmit power configurations.

Some aspects described herein relate to a method of wireless communication performed by a network entity. The method may include transmitting, to a UE, a CSI report configuration including multiple CSI-RS transmit power configurations. The method may include receiving, from the UE, the CSI report, wherein the CSI report is associated with at least one CSI processing parameter that is based at least in part on the multiple CSI-RS transmit power configurations.

Some aspects described herein relate to an apparatus for wireless communication at a UE. The apparatus may include a memory and one or more processors coupled to the memory. The one or more processors may be configured to receive, from a network entity, a CSI report configuration including multiple CSI-RS transmit power configurations. The one or more processors may be configured to transmit, to the network entity, the CSI report, wherein the CSI report is associated with at least one CSI processing parameter that is based at least in part on the multiple CSI-RS transmit power configurations.

Some aspects described herein relate to an apparatus for wireless communication at a network entity. The apparatus may include a memory and one or more processors coupled to the memory. The one or more processors may be configured to transmit, to a UE, a CSI report configuration including multiple CSI-RS transmit power configurations. The one or more processors may be configured to receive, from the UE, the CSI report, wherein the CSI report is associated with at least one CSI processing parameter that is based at least in part on the multiple CSI-RS transmit power configurations.

Some aspects described herein relate to a non-transitory computer-readable medium that stores a set of instructions for wireless communication by a UE. The set of instructions, when executed by one or more processors of the UE, may cause the UE to receive, from a network entity, a CSI report configuration including multiple CSI-RS transmit power configurations. The set of instructions, when executed by one or more processors of the UE, may cause the UE to transmit, to the network entity, the CSI report, wherein the CSI report is associated with at least one CSI processing parameter that is based at least in part on the multiple CSI-RS transmit power configurations.

Some aspects described herein relate to a non-transitory computer-readable medium that stores a set of instructions for wireless communication by a network entity. The set of instructions, when executed by one or more processors of the network entity, may cause the network entity to transmit, to a UE, a CSI report configuration including multiple CSI-RS transmit power configurations. The set of instructions, when executed by one or more processors of the network entity, may cause the network entity to receive, from the UE, the CSI report, wherein the CSI report is associated with at least one CSI processing parameter that is based at least in part on the multiple CSI-RS transmit power configurations.

Some aspects described herein relate to an apparatus for wireless communication. The apparatus may include means for receiving, from a network entity, a CSI report configuration including multiple CSI-RS transmit power configurations. The apparatus may include means for transmitting, to the network entity, the CSI report, wherein the CSI report is associated with at least one CSI processing parameter that is based at least in part on the multiple CSI-RS transmit power configurations.

Some aspects described herein relate to an apparatus for wireless communication. The apparatus may include means for transmitting, to a UE, a CSI report configuration including multiple CSI-RS transmit power configurations. The apparatus may include means for receiving, from the UE, the CSI report, wherein the CSI report is associated with at least one CSI processing parameter that is based at least in part on the multiple CSI-RS transmit power configurations.

Aspects generally include a method, apparatus, system, computer program product, non-transitory computer-readable medium, user equipment, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
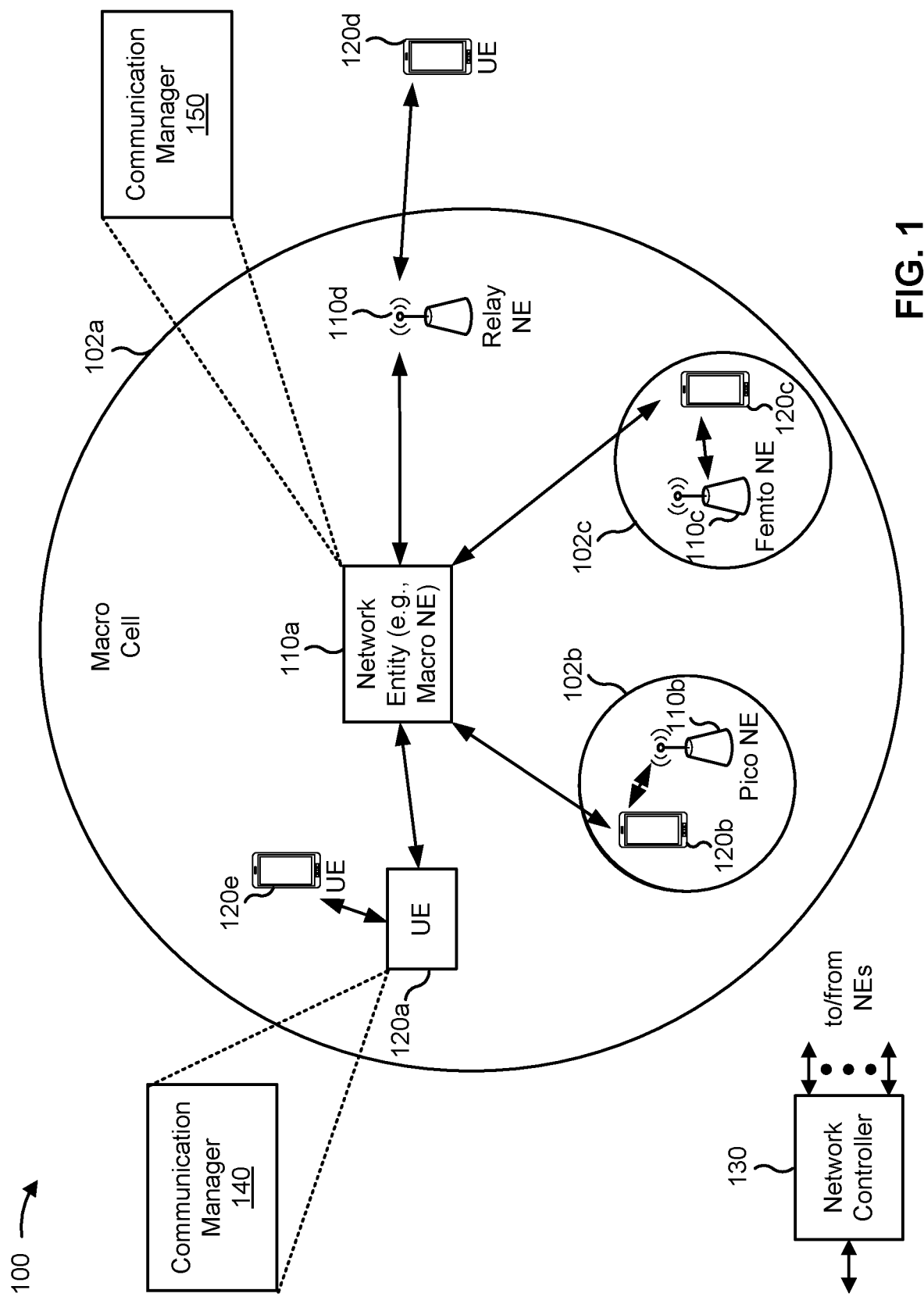
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as an NE 110a, an NE 110b, an NE 110c, and an NE 110d), a user equipment (UE) 120 or multiple UEs 120 (shown as a UE 120a, a UE 120b, a UE 120c, a UE 120d, and a UE 120e), and/or other network entities. A network entity 110 is an entity that communicates with UEs 120. A network entity 110 (sometimes referred to as an NE) may include, for example, an NR network entity, an LTE network entity, a Node B, an eNB (e.g., in 4G), a gNB (e.g., in 5G), an access point, a transmission reception point (TRP), a base station, and/or a disaggregated portion of a base station according to an open radio access network (O-RAN) architecture or the like, such as a centralized unit (CU), a distributed unit (DU), and/or a radio Unit (RU), which are described in more detail in connection with FIG. 3. Each network entity 110 may provide communication coverage for a particular geographic area. In the Third Generation Partnership Project (3GPP), the term "cell" can refer to a coverage area of a network entity 110 and/or a network entity subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network entity 110 for a macro cell may be referred to as a macro network entity. A network entity 110 for a pico cell may be referred to as a pico network entity. A network entity 110 for a femto cell may be referred to as a femto network entity or an in-home network entity. In the example shown in FIG. 1, the NE 110a may be a macro network entity for a macro cell 102a, the NE 110b may be a pico network entity for a pico cell 102b, and the NE 110c may be a femto network entity for a femto cell 102c. A network entity may support one or multiple (e.g., three) cells.

In some examples, a cell may not necessarily be stationary, and the geographic area of the cell may move according to the location of a network entity 110 that is mobile (e.g., a mobile network entity). In some examples, the network entities 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the NE 110d (e.g., a relay network entity) may communicate with the NE 110a (e.g., a macro network entity) and the UE 120d in order to facilitate communication between the NE 110a and the UE 120d. A network entity 110 that relays communications may be referred to as a relay station, a relay network entity, a relay, or the like.

The wireless network 100 may be a heterogeneous network that includes network entities 110 of different types, such as macro network entities, pico network entities, femto network entities, relay network entities, or the like. These different types of network entities 110 may have different transmit power levels, different coverage areas, and/or different impacts on interference in the wireless network 100. For example, macro network entities may have a high transmit power level (e.g., 5 to 40 watts) whereas pico network entities, femto network entities, and relay network entities may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity 110, a channel state information (CSI) report configuration including multiple CSI reference signal (CSI-RS) transmit power configurations; and transmit, to the network entity 110, the CSI report, wherein the CSI report is associated with at least one CSI processing parameter that is based at least in part on the multiple CSI-RS transmit power configurations. Additionally, or alternatively, the communication manager 140 may perform one or more other operations described herein.

In some aspects, the network entity 110 may include a communication manager 150. As described in more detail elsewhere herein, the communication manager 150 may transmit, to a UE 120, a CSI report configuration including multiple CSI-RS transmit power configurations; and receive, from the UE, the CSI report, wherein the CSI report is associated with at least one CSI processing parameter that is based at least in part on the multiple CSI-RS transmit power configurations. Additionally, or alternatively, the communication manager 150 may perform one or more other operations described herein.

As indicated above, FIG. 1 is provided as an example. Other examples may differ from what is described with regard to FIG. 1.

Figure 2:
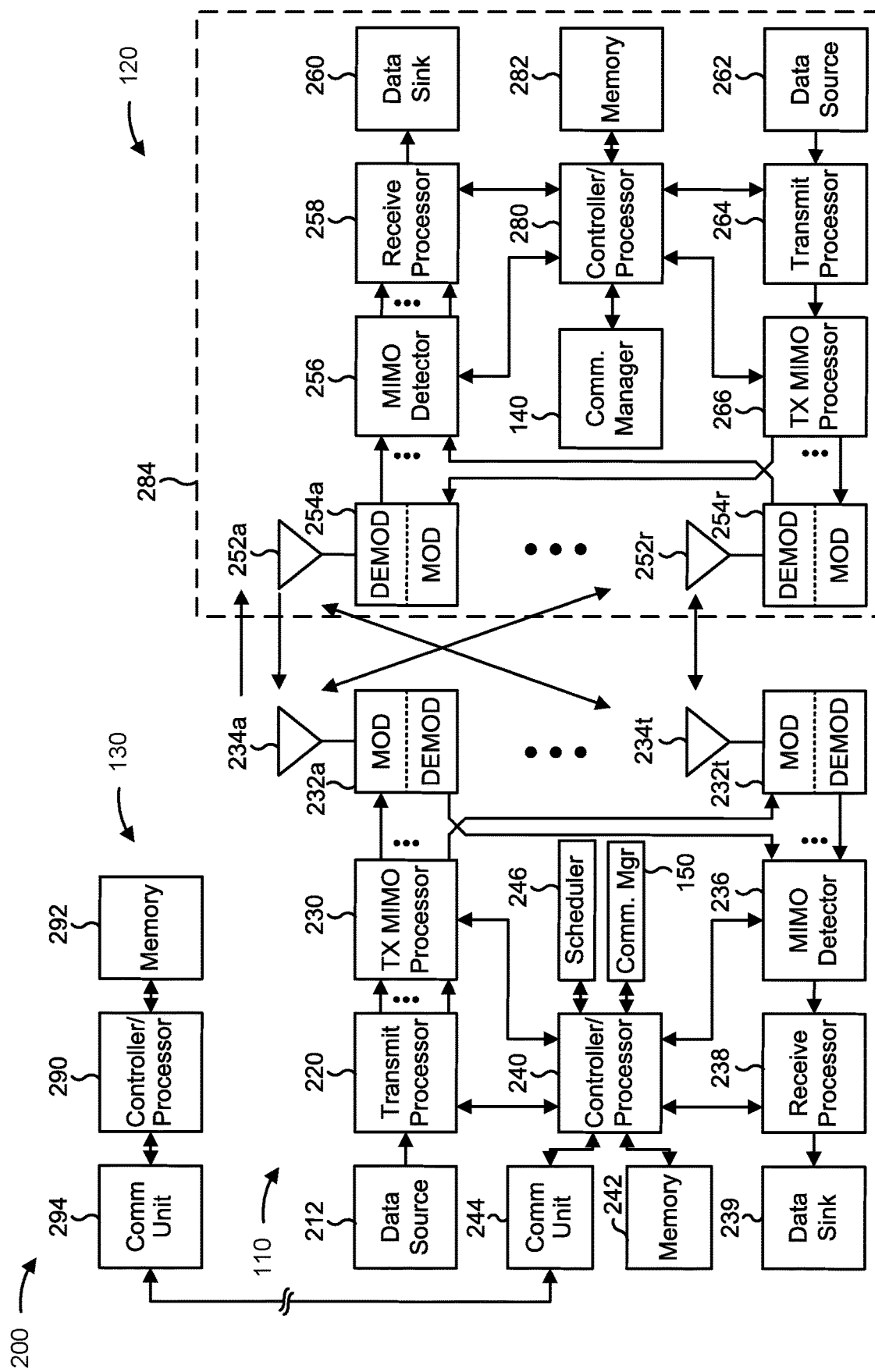
FIG. 2 is a diagram illustrating an example of a network entity in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network entity 110, the controller/processor 280 of the UE 120, and/or any other component(s) of FIG. 2 may perform one or more techniques associated with CSI processing parameters for dynamic network entity power adaptation, as described in more detail elsewhere herein. For example, the controller/processor 240 of the network entity 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity 110, a CSI report configuration including multiple CSI-RS transmit power configurations; and/or means for transmitting, to the network entity 110, the CSI report, wherein the CSI report is associated with at least one CSI processing parameter that is based at least in part on the multiple CSI-RS transmit power configurations. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity 110 includes means for transmitting, to a UE 120, a CSI report configuration including multiple CSI-RS transmit power configurations; and/or means for receiving, from the UE 120, the CSI report, wherein the CSI report is associated with at least one CSI processing parameter that is based at least in part on the multiple CSI-RS transmit power configurations. In some aspects, the means for the network entity 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
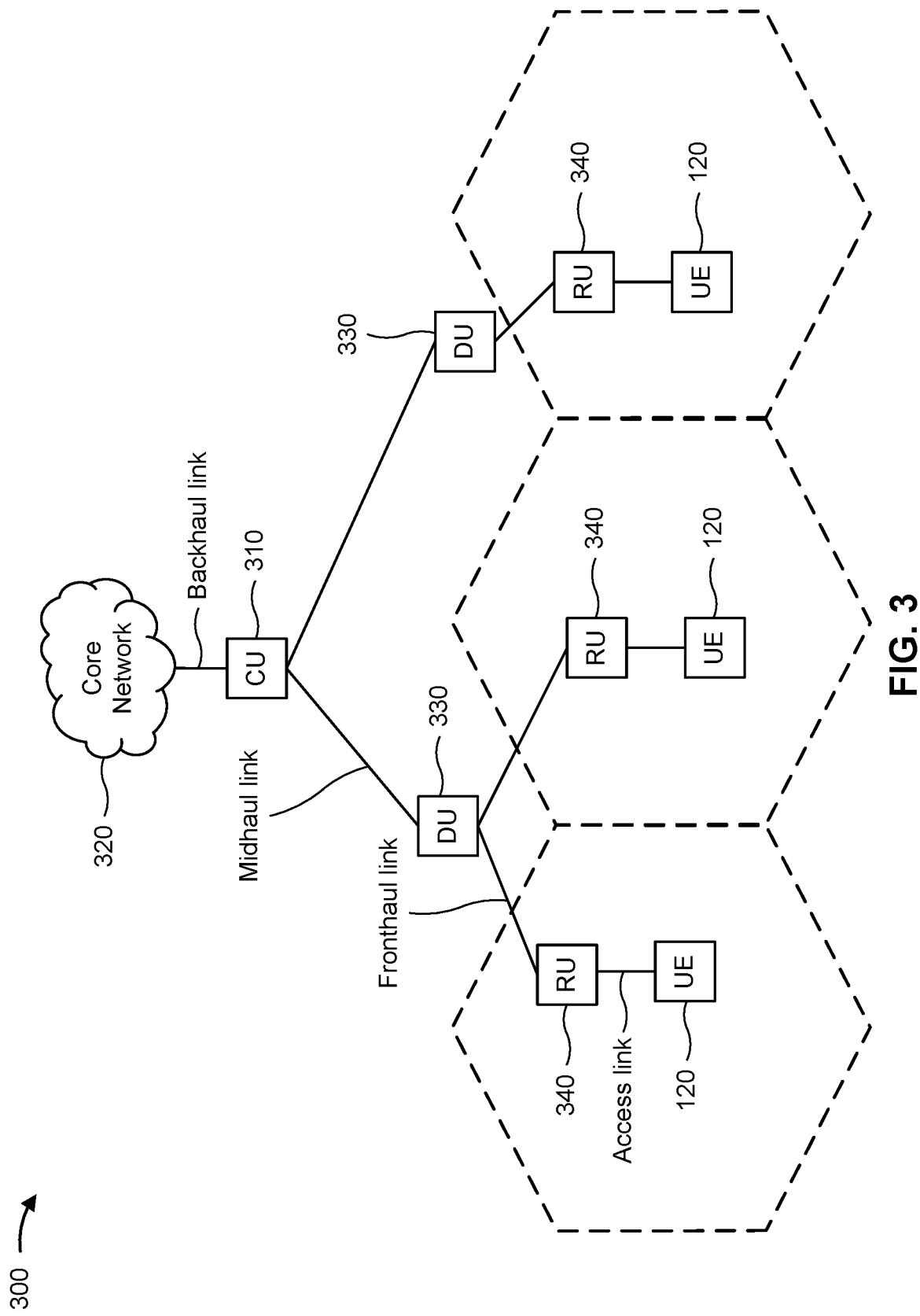
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a network entity 110 (e.g., a base station, an eNB, or a gNB) is provided by a DU 330 and one or more RUs 340 that communicate over a fronthaul link. Accordingly, as described herein, a network entity 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
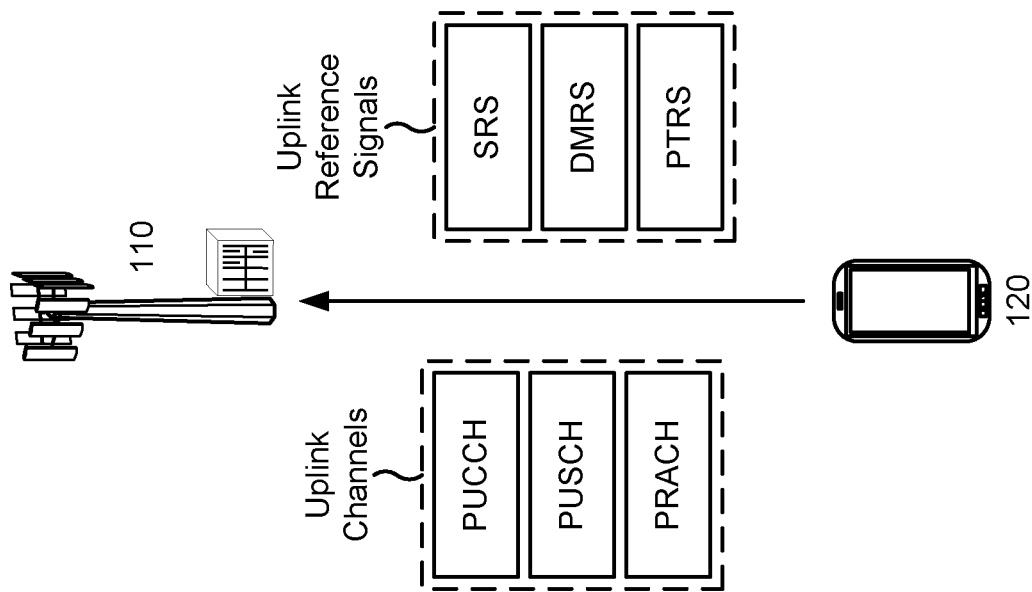
FIG. 4 is a diagram illustrating an example of physical channels and reference signals in a wireless network, in accordance with the present disclosure.
Figure 4:
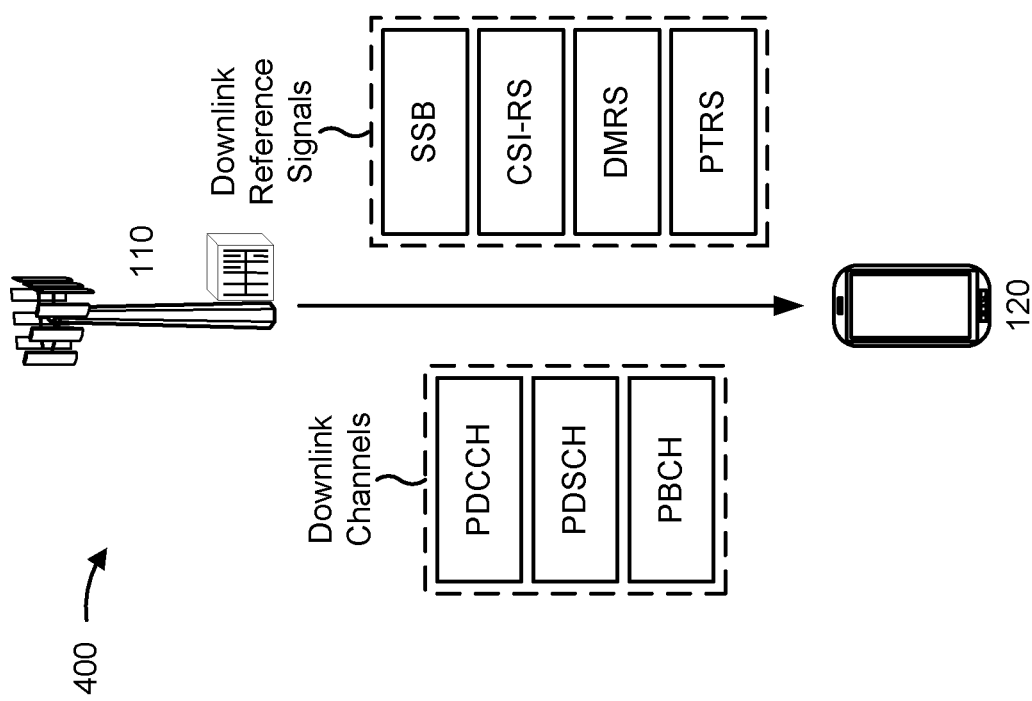

FIG. 4 is a diagram illustrating an example 400 of physical channels and reference signals in a wireless network, in accordance with the present disclosure. As shown in FIG. 4, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network entity 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 110 may configure a set of CSI-RSs for the UE 120, and the UE 120 may measure the configured set of CSI-RSs. For example, a network entity may configure a set of CSI-RS resources using a CSI reporting setting (e.g., a CSI report configuration), and the UE 120 may perform a channel measurement, an interference measurement, or the like based on the configured set of CSI-RS resources. In some aspects, the CSI-RS resources may include one or more of a non-zero power (NZP) CSI-RS resource for channel measurement (sometimes referred to as an NZP CMR resource), a CSI-RS resource for interference measurement (sometimes referred to as a CSI-IM resource), or an NZP CSI-RS resource for interference measurement (sometimes referred to as an NZP IMR resource). The CSI reporting setting may configure additional parameters, such as a power offset of an NZP CSI-RS resource element (RE) with respect to an SSS RE (sometimes referred to as powerControlOffsetSS, which may be in decibels (dB)), and/or a power offset of a PDSCH RE with respect to an NZP CSI-RS RE (sometimes referred to as powerControlOffset, which may be in dB). The CSI reporting setting may also configure a type of CSI report to be used, such as one of a periodic CSI report, a semi-persistent CSI report, or an aperiodic CSI report. The CSI reporting setting may be RRC configured per bandwidth part (BWP), and may configure one or more resource sets, each resource set including Ks CSI-RS resources with the same number of CSI-RS ports. When Ks is equal to 1, each CSI-RS resource may contain up to 32 CSI-RS ports. When Ks is equal to 2, each CSI-RS resource may contain up to 16 CSI-RS ports. And when Ks is greater than 2 and less than or equal to 8, each CSI-RS resource may contain up to 8 CSI-RS ports.

Based at least in part on the measurements of the CSI-RSs, the UE 120 may perform channel estimation and may report channel estimation parameters to the network entity 110 (e.g., in a CSI report), such as a CQI, a precoding matrix indicator (PMI), a CSI-RS resource indicator (CRI), a layer indicator (LI), a rank indicator (RI), or an RSRP, among other examples. The network entity 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. In some aspects, the UE 120 may compute certain processing parameters (sometimes referred to as CSI processing parameters) related to the CSI measurements and reporting procedures described above. Aspects of the CSI processing parameters are described in more detail in connection with FIGS. 5 and 6.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
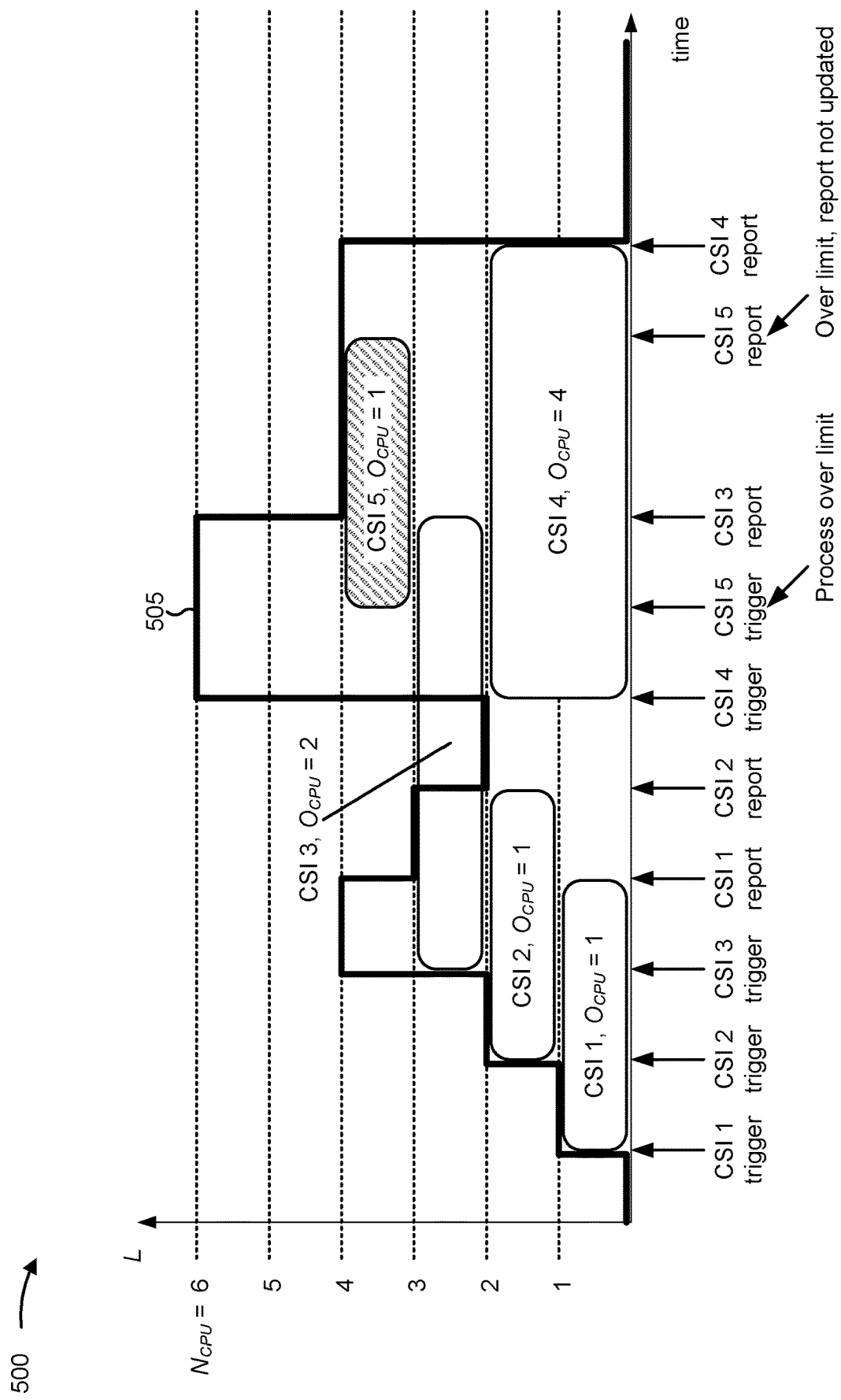
FIG. 5 is a diagram illustrating an example of computing channel state information (CSI) processing parameters, in accordance with the present disclosure.

FIG. 5 is a diagram illustrating an example 500 of computing CSI processing parameters, in accordance with the present disclosure.

In some aspects, the UE 120 may compute one or more CSI processing parameters in connection with the CSI measuring and reporting procedures described above in connection with FIG. 4 or similar CSI reporting procedures. For example, the UE 120 may receive a CSI report configuration (e.g., a CSI reporting setting), and may compute one or more CSI processing parameters in connection with performing measurements or the like associated with the corresponding report. For example, the UE 120 may compute one or more CSI processing parameters by counting a number of simultaneously occupied CSI processing units (CPUs) associated with a CSI report, a number of simultaneously active CSI resources associated with a CSI report, and/or similar CSI processing parameters.

More particularly, FIG. 5 illustrates aspects associated with counting a number of simultaneously occupied CPUs associated with a CSI report. In some aspects, the UE 120 may report to a network entity 110 the UE 120's capability on the number of simultaneous CPUs the UE 120 can handle, referred to as $N_{CPU}$. When processing CSI related information, the UE 120 may keep a running count of occupied CPUs (sometimes referred to as L), which are associated with the processing units that are in use by ongoing CSI reports. Any time a CSI calculation begins, the count, L, may be incremented by $O_{CPU}$, where $O_{CPU}$ is the load designation of the new CSI process. The load designation for a CSI process (e.g., $O_{CPU}$) may be rule-based (e.g., set by a wireless standard and/or hard-coded at the UE 120) and/or may be indicated by a network entity 110 configuring the CSI report. For example, $O_{CPU}$ may be equal to 0 for a CSI report configuration (sometimes referred to as CSI-ReportConfig) associated with a higher layer report quantity parameter (sometimes referred to as reportQuantity) set to "none" and a CSI resource set (sometimes referred to as CSI-RS-ResourceSet) associated with a higher layer tracking reference signal (TRS) parameter (sometimes referred to as trs-Info) configured. $O_{CPU}$ may be equal to 1 for a CSI report configuration (e.g., CSI-ReportConfig) associated with a higher layer report quantity parameter (e.g., report Quantity) set to "cri-RSRP," "ssb-Index-RSRP," "cri-SINR," "ssb-Index-SINR," or "none," and a CSI resource set (e.g., CSI-RS-ResourceSet) with a higher layer TRS parameter (e.g., trs-Info) not configured. For a CSI report configuration (e.g., CSI-ReportConfig) associated with a higher layer report quantity parameter (e.g., reportQuantity) set to "cri-RI-PMI-CQI," "cri-RI-i1," "cri-RI-i1-CQI," "cri-RI-CQI," or "cri-RI-LI-PMI-CQI," $O_{CPU}$ may be equal to $N_{CPU}$ if the following criteria are met: a CSI report is aperiodically triggered without transmitting a PUSCH with either a transport block or a hybrid automatic repeat request (HARQ) ACK or both when L=0 CPUs are occupied, where the CSI corresponds to a single CSI with wideband frequency-granularity and to at most 4 CSI-RS ports in a single resource without CRI report, and where a codebook type parameter (sometimes referred to as codebookType) is set to "typeI-SinglePanel" or where a higher layer report quantity parameter (e.g., reportQuantity) is set to "cri-RI-CQI." For a CSI report configuration (e.g., CSI-ReportConfig) associated with a higher layer report quantity parameter (e.g., reportQuantity) set to "cri-RI-PMI-CQI," "cri-RI-i1," "cri-RI-i1-CQI," "cri-RI-CQI," or "cri-RI-LI-PMI-CQI" but the additional criteria described above is not met, $O_{CPU}$ may be equal to Ks, where Ks is the number of CSI-RS resources in the CSI-RS resource set for channel measurement.

Similarly, when (e.g., any time) a CSI calculation ends, the count, L, is decremented by $O_{CPU}$ (e.g., the load designation of the completed process). At any given time, the $N_{CPU}$-L unoccupied CPUs may be used to add more CSI reports. Once there are no more unoccupied CPUs available, the UE 120 may not process more CSI, but instead may send an outdated CSI report (e.g., prior report and/or based on previous measurements) for any CSI requests that are over the limit (e.g., for any CSI reporting settings received that would put L over the limit $N_{CPU}$, the UE 120 does not perform additional CSI measurements but instead transmits an outdated CSI report for the corresponding CSI reporting setting).

For example, the line shown by reference number 505 in FIG. 5 corresponds to the running count of occupied CPUs, L. In this example, the UE 120 may be capable of handling six simultaneous CPUs (e.g., $N_{CPU}$=6). The UE 120 in this example may receive one or more CSI report configurations (e.g., one or more CSI reporting settings) configuring the UE 120 to generate five CSI reports, indexed as CSI 1 through CSI 5. The first CSI report (CSI 1), the second CSI report (CSI 2), and the fifth CSI report (CSI 5) may be associated with a load designation of 1 CPU (e.g., $O_{CPU}$=1), the third CSI report (CSI 3) may be associated with a load designation of 2 CPUs (e.g., $O_{CPU}$=2), and the fourth CSI report (CSI 4) may be associated with a load designation of 4 CPUs. Accordingly, when the first CSI report is triggered, L is increased by 1, when the second CSI report is triggered, L is again increased by 1 (for a running count of 2 CPUs), and when the third CSI report is triggered, L is increased by 2 (for a running count of 4 CPUs). Thereafter, the first CSI report and the second CSI report may be completed and reported to the network before other CSI reports begin, and thus L may be decreased by 1 CPU for each completed report (for an updated running count of 2 CPUs). However, the fourth CSI report is associated with a load designation of 4, and thus when the fourth CSI report begins and L is increased by 4 (for a running count of 6 CPUs (e.g., the 2 CPUs used for the ongoing third CSI report and the 4 CPUs using for the fourth CSI report)), the UE 120 has reached the maximum number of simultaneous CPUs the UE 120 can handle (e.g., $N_{CPU}$). Thus, when the fifth CSI report is triggered, the UE 120 has no remaining unoccupied CPUs available, and thus the UE 120 may not perform additional CSI measurements corresponding to the fifth CSI report. Instead, for the fifth CSI report, the UE 120 may send an outdated CSI report to the network.

When a CPU becomes occupied for purposes of the running count of occupied CPUs (e.g., L) may depend on a nature of the CSI report (e.g., whether it is periodic, semi-persistent, or aperiodic), and, for periodic or semi-persistent CSI reports, the position of the specific report in a sequence of reports. More particularly, for periodic and semi-persistent CSI reports, for any report other than the first report in a sequence of CSI reports on a PUSCH, a CPU becomes occupied at the latest CSI measurement resource (e.g., a CSI-RS resource, a CSI interference measurement (CSI-IM) resource, or an SSB resource) that is usable for the report, and the CPU is released at the end of the last symbol of the PUCCH or PUSCH carrying the report. Moreover, the latest CSI measurement resource may correspond to the latest CSI measurement resource that is not later than a configured and/or predefined CSI reference resource. If multiple CSI reference resources are configured and/or predefined for a given report and the CSI reference resources do not occur at the same time, then the earliest of the CSI reference resources may be used to determine the latest CSI measurement resource.

For the first report in a sequence of CSI reports on a PUSCH, a CPU becomes occupied at the end of the last symbol of the PDCCH activating the CSI process, and the CPU is released at the end of the last symbol of the PUSCH carrying the first report. Similarly, for an aperiodic CSI report, the CPU becomes occupied at the end of the last symbol of the PDCCH activating the CSI process, and the CPU is released at the end of the last symbol of the PUSCH or PUCCH carrying the report.

Relatedly, in some aspects, a UE 120 may count a number of simultaneously active CSI-RS resources associated with a CSI report as another example of a CSI processing parameter. More particularly, the UE 120 may report to a network entity 110 the UE 120's capability on the number of simultaneously active CSI-RS resources that the UE 120 can handle. This may include reporting a maximum number of simultaneously active NZP CSI-RS resources per component carrier, reporting a maximum total number of ports in all simultaneously active NZP CSI-RS resources per component carrier, reporting a maximum number of simultaneously active NZP CSI-RS resources across all component carriers, and/or reporting a maximum total number of ports in all simultaneously active NZP CSI-RS resources across all component carriers.

When processing CSI related information, the UE 120 may keep a running count of simultaneously active CSI-RS resources associated with ongoing CSI reports. When a CSI-RS resource becomes active for purposes of the running count of simultaneously active CSI-RS resources may depend on a nature of the CSI-RS resource (e.g., whether it is periodic, semi-persistent, or aperiodic). For an aperiodic CSI-RS resource, the CSI-RS resource and the ports within the resource may become active at the end of the last symbol of the PDCCH carrying the associated CSI trigger, and the CSI-RS resource may become inactive at the end of the last symbol of the PUSCH carrying the associated CSI report. For a periodic CSI-RS resource, the CSI-RS resource and the ports within the resource may become active at the time of the configuration of the CSI-RS resource, and the CSI-RS resource may become inactive at the time of the release of the CSI-RS resource configuration. And for a semi-persistent CSI-RS resource, the CSI-RS resource and the ports within the resource may become active at the time of the activation of the CSI-RS resource, and the CSI-RS resource may become inactive at the time of the deactivation of the CSI-RS resource. Moreover, for any of the above, if a CSI-RS resource is referred N times by one or more CSI reporting settings (e.g., one or more CSI report configurations), the CSI-RS resource the ports with the resource may be counted N times.

While the above-described CSI processing parameters (e.g., the number of CPUs associated with a CSI report and/or a number of simultaneously active CSI-RS resources associated with a CSI report) may correspond to a CSI processing load at the UE 120 when a single CSI-RS transmit power configuration is implemented (e.g., when a single transmit power is utilized for a configured CSI report), the CSI processing parameters may not accurately correspond to the CSI processing load at the UE 120 when the CSI report is configured with multiple CSI-RS transmit power configurations. More particularly, a network entity 110 may be associated with a massive-MIMO active antenna unit (AAU) that includes multiple, co-located panels consisting of multiple antenna ports. Each panel may be equipped with numerous power amplifiers and antenna subsystems, which consume large amounts of power. For example, more than 20% of all expenses associated with a wireless network may be attributed to energy costs necessary to operate the wireless network, and, of those energy costs, over 50% may be attributed to radio access network (RAN) energy costs. Thus, in an effort to reduce energy consumption or the like, a wireless network may dynamically turn off one or more panels, subpanels, or antenna ports associated with a network entity or otherwise perform certain actions to lower power consumption when the cell load is low.

In such aspects, a CSI report configuration (e.g., a CSI reporting setting), may indicate more than one CSI-RS transmit power configuration such that a network entity 110 may receive CSI for each of multiple potential transmit power levels. For example, the configuration of the CSI report may indicate a first CSI-RS transmit power configuration associated with the network entity 110 transmitting at full power, and one or more additional CSI-RS transmit power configurations associated with the network entity 110 transmitting at less than full power (e.g., one or more power settings associated with the network entity 110 transmitting with less than all of antenna panels or ports during periods of low load, or the like). In some aspects, a CSI report configuration may configure multiple power offsets (e.g., multiple powerControlOffsetSS parameters and/or multiple powerControlOffset parameters) corresponding to each transmit power setting.

In such aspects, the UE 120 may need to derive CSI for each CSI-RS transmit power configuration and report the CSI for each CSI-RS transmit power configuration to the network entity 110. However, legacy CSI processing parameters and requirements (e.g., the number of CPUs associated with a CSI report and/or a number of simultaneously active CSI-RS resources associated with a CSI report, described above) assume a single CSI-RS transmit power configuration per CSI reporting setting. Accordingly, such CSI processing parameters may not accurately reflect a processing load at the UE 120, which may be determining and reporting more CSI and consuming more resources than assumed under the legacy CSI processing parameters. This may result in an under-accounted-for CSI processing load, leading to incomplete CSI measurements and reporting, and thus inaccurate or outdated CSI information being reported to the network entity 110. Accordingly, the network entity 110 may not be able to accurately estimate channels associated with the multiple CSI-RS transmit power configurations using the inaccurate or outdated CSI information, resulting in poor link quality and thus increased latency, reduced throughput, and even link failure.

Some techniques and apparatuses described herein enable accurate CSI processing parameter computations that account for multiple CSI-RS transmit power configurations in a given CSI report configuration (e.g., in a given CSI reporting setting). In some aspects, a UE 120 may receive, from a network entity 110, a CSI report configuration that includes multiple CSI-RS transmit power configurations, and the UE 120 may transmit, to the network entity 110, a CSI report in accordance with the configuration of the CSI report. In some aspects, the CSI report may be associated with at least one CSI processing parameter that is based at least in part on the multiple CSI-RS transmit power configurations. In this way, a UE may more accurately account for a CSI processing load when configured with multiple CSI-RS transmit power configurations, leading to robust CSI measurements and reports, and thus improved channel quality, decreased latency, increased throughput, and overall more efficient resource utilization.

As indicated above, FIG. 5 is provided as an example. Other examples may differ from what is described with regard to FIG. 5.

Figure 6:
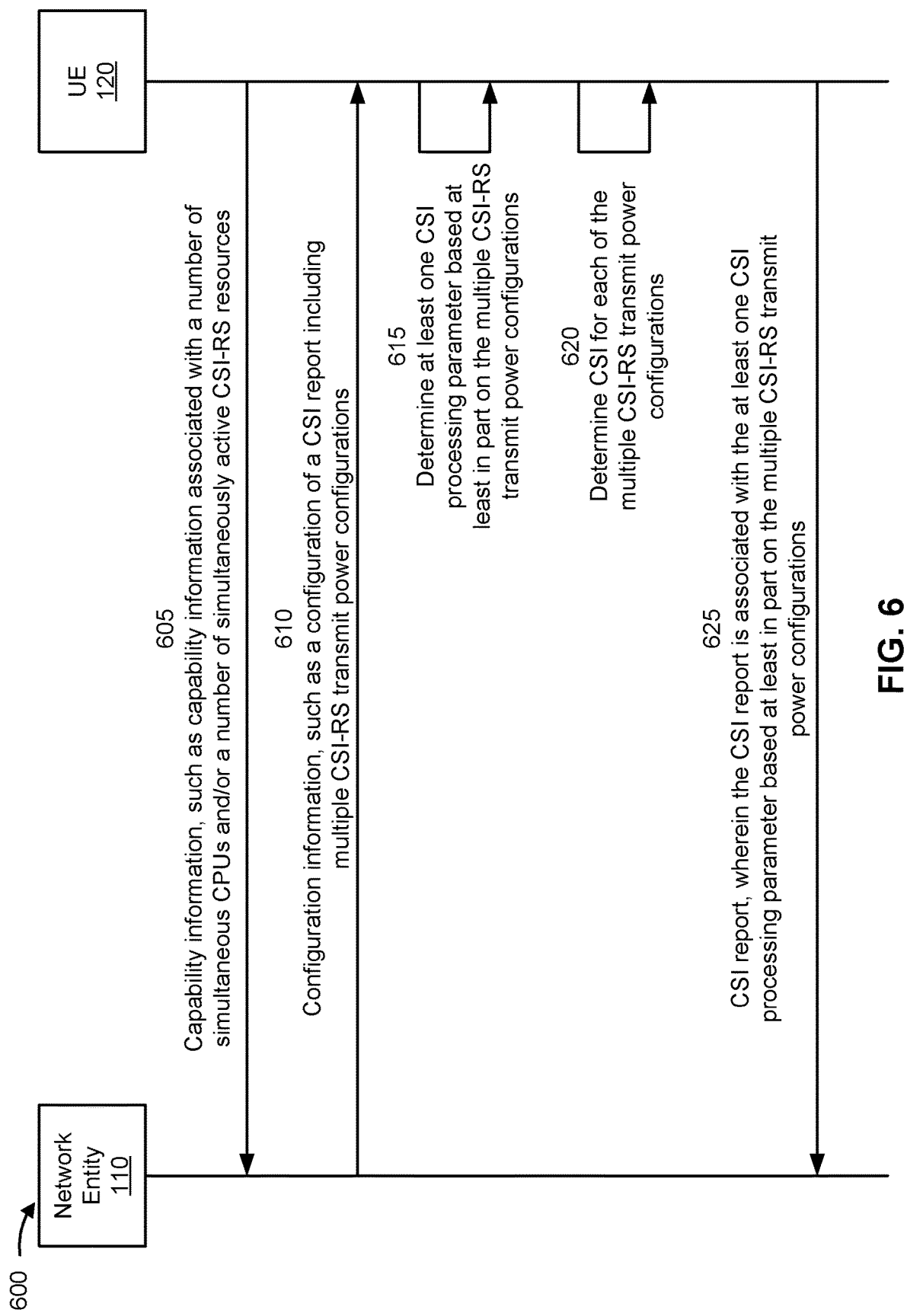
FIG. 6 is a diagram of an example associated with CSI processing parameters for dynamic network entity power adaptation, in accordance with the present disclosure.

FIG. 6 is a diagram of an example 600 associated with CSI processing parameters for dynamic network entity power adaptation, in accordance with the present disclosure. As shown in FIG. 6, a UE 120 and a network entity 110 may communicate with one another. In some aspects, the UE 120 and the network entity 110 may be part of a wireless network (e.g., wireless network 100). The UE 120 and the network entity 110 may have established a wireless connection prior to operations shown in FIG. 6.

As shown by reference number 605, the UE 120 may transmit, to the network entity 110, capability information. The network entity 110 may receive the capability information from the UE 120. In some aspects, the capability information may indicate UE 120 support for certain CSI processing parameters. For example, in some aspects, the capability information may indicate a number of simultaneous CPUs (e.g., $N_{CPU}$) that the UE 120 is capable of processing. Additionally, or alternatively, the capability information may indicate a number of simultaneously active CSI-RS resources the UE 120 is capable of processing.

As shown by reference number 610, the network entity 110 may transmit, to the UE 120, configuration information. The UE 120 may receive, from the network entity 110, the configuration information. In some aspects, the UE 120 may receive the configuration information via one or more of RRC signaling, one or more MAC control elements (MAC-CEs), and/or DCI, among other examples. In some aspects, the configuration information may include an indication of one or more configuration parameters (e.g., already configured for the UE 120 and/or previously indicated by the network entity 110 or other network device) for selection by the UE 120, and/or explicit configuration information for the UE 120 to use to configure the UE 120, among other examples.

In some aspects, the configuration information may include a CSI report configuration (e.g., a CSI reporting setting) including multiple CSI-RS transmit power configurations. For example, the configuration information may include a configuration of a first CSI-RS transmit power configuration corresponding to a full-power transmission by the network entity 110 (e.g., corresponding to a transmission by the network entity 110 using all available antenna panels and/or ports, or the like), as well as one or more additional CSI-RS transmit power configurations corresponding to a reduced-power transmission by the network entity 110 (e.g., corresponding to a transmission by the network entity 110 using less than all available antenna panels and/or ports, or the like, such as when the network entity 110 may turn off panels, subpanels, and/or ports during periods of low network load). The power used for a reduced-power transmission is less than the power used for the full-power transmission. As another example, the configuration information may include a configuration of a first CSI-RS transmit power configuration corresponding to a high-power transmission by the network entity 110, as well as one or more additional CSI-RS transmit power configurations corresponding to a low-power transmission by the network entity 110 (e.g., corresponding to a transmission by the network entity 110 using less antenna panels and/or ports, or the like than used for the high-power transmission). In some aspects, the configuration of the multiple CSI-RS transmit power configurations may be associated with multiple configured power offsets, such as multiple powerControlOffsetSS parameters and/or multiple powerControlOffset parameters. The UE 120 may configure itself based at least in part on the configuration information. In some aspects, the UE 120 may be configured to perform one or more operations described herein based at least in part on the configuration information.

More particularly, and as shown by reference number 615, the UE 120 may determine at least one CSI processing parameter based at least in part on the multiple CSI-RS transmit power configurations. For example, the at least one CSI processing parameter may include a number of CPUs associated with the CSI report. In such aspects, the number of CPUs associated with the CSI report may be based at least in part on a number of configured CSI-RS resources and a number of the multiple CSI-RS transmit power configurations. In this way, by considering the number of the multiple CSI-RS transmit power configurations in addition to the number of configured CSI-RS resources, the UE 120 may more accurately determine a processing load associated with the CSI report as compared to legacy CSI reporting procedures, in which it is assumed that only a single CSI-RS transmit power configuration will be employed by the network entity 110.

In some aspects, the number of CPUs associated with the CSI report is based at least in part on a product of the number of the configured CSI-RS resources and the number of the multiple CSI-RS transmit power configurations. For example, the number of the configured CSI-RS resources may sometimes be referred to as K, and the number of the multiple CSI-RS transmit power configurations may sometimes be referred to as M Accordingly, in some aspects, the number of CPUs associated with the CSI report may be based at least in part on K×M. In some aspects, the number of CPUs associated with the CSI report may be further based at least in part on a CPU scaling factor (sometimes referred to as a) associated with the product of the number of the configured CSI-RS resources and the number of the multiple CSI-RS transmit power configurations (e.g., K×M). Put another way, the number of CPUs associated with the CSI report may be based at least in part on $\alpha \times K \times M$. In some aspects, the UE 120 may be hard-coded and/or preconfigured with the CPU scaling factor. In some other aspects, the network node 110 may configure the UE 120 with the CPU scaling factor and/or dynamically indicate the CPU scaling factor to the UE 120. For example, the network node 110 may indicate the CPU scaling factor to the UE 120 via the configuration information described in connection with reference number 610, and/or via another RRC communication, MAC-CE communication, DCI communication, or a similar communication.

Moreover, the CPU scaling factor (e.g., a) may be less than or equal to one. More particularly, when the CPU scaling factor is equal to one, the CPU scaling factor may fully account for CPUs used to process the CSI report associated with the multiple CSI-RS transmit power configurations. However, in some aspects, certain CSI processing steps or the like to be performed by the UE 120 may overlap between the multiple configured CSI-RS transmit power configurations. According, in some aspects, the CPU scaling factor may be configured to be less than one in order to not overestimate a processing load on the UE 120, thereby freeing additional resources to be used for determining CSI for other CSI-RS transmit power configurations, or the like. By determining a number of CPUs associated with the CSI report that is based at least in part on at least in part on a product of the number of the configured CSI-RS resources and the number of the multiple CSI-RS transmit power configurations (e.g., that is based at least in part on $\alpha \times K \times m$), the UE 120 may appropriately account for occupied computing resources of the UE 120 associated with generating multiple CSI reports corresponding to the multiple configured power settings.

Additionally, or alternatively, the at least one CSI processing parameter may include a number of simultaneously active CSI-RS resources associated with the CSI report. In some aspects, this may include the UE 120 determining a number of ports associated with the number of simultaneously active CSI-RS resources associated with the CSI report. In either aspect, and in a similar manner as described above in connection with the UE 120 determining the number of CPUs associated with the CSI report, the number of simultaneously active CSI-RS resources associated with the CSI report may be based at least in part on a number of the multiple CSI-RS transmit power configurations (e.g., M). Moreover, in some aspects, the number of simultaneously active CSI-RS resources associated with the CSI report may be based at least in part on a resource counting scaling factor (sometimes referred to as β) associated with the number of the multiple CSI-RS transmit power configurations. In some aspects, the UE 120 may be hard-coded and/or preconfigured with the resource counting scaling factor. In some other aspects, the network node 110 may configure the UE 120 with the resource counting scaling factor and/or dynamically indicate the resource counting scaling factor to the UE 120. For example, the network node 110 may indicate the resource counting scaling factor to the UE 120 via the configuration information described in connection with reference number 610, and/or via another RRC communication, MAC-CE communication, DCI communication, or a similar communication. In a similar manner as the CPU scaling factor described above (e.g., a), in some aspects, the resource counting scaling factor (e.g., β) may be less than or equal to one. When the resource counting scaling factor is equal to one, the resource counting factor may fully account for active CSI resources used to process the CSI report associated with the multiple CSI-RS transmit power configurations. However, and as described above, certain CSI processing steps or the like to be performed by the UE 120 may overlap between the multiple configured CSI-RS transmit power configurations. According, in some aspects, the resource counting scaling factor may be configured to be less than one in order to not overestimate an active CSI resource load, thereby freeing additional CSI resources to be used for determining CSI for other CSI-RS transmit power configurations, or the like.

In some aspects, if a CSI-RS resource is referred to by a CSI reporting setting with multiple CSI-RS transmit power configurations (sometimes referred to as multiple power offset configurations), counting the CSI-RS resources (and, in some aspects, the CSI-RS ports within the CSI-RS resource) for the CSI reporting setting may depend on the number of power offset configurations associated with the CSI-RS resource. Put another way, the CSI-RS resources may be counted according to $C_n = \Sigma_{i=1}^{T} \beta_i M_i$, where $\beta_i \leq 1$ is the resource counting scaling factor associated with a group of $M_i$ of power offset configurations, and where $\Sigma_{i=1}^{T} M_i = M$. Accordingly, in aspects in which a given CSI-RS resource is referred to Ntimes by one or more CSI reporting settings, the CSI-RS resource may be counted $\Sigma_{n=0}^{N-1} C_n$ times. By determining a number of simultaneously active CSI-RS resources associated with the CSI report that is based at least in part on the number of the multiple CSI-RS transmit power configurations, the UE 120 may appropriately account for active CSI-RS resources associated with generating multiple CSI reports corresponding to the multiple configured power settings.

As shown by reference number 620, in some aspects, the UE 120 may determine CSI for each of the multiple CSI-RS transmit power configurations. For example, the UE 120 may determine CSI for a full-power CSI-RS transmit power configuration (e.g., a configuration in which the network entity 110 transmits using all available antennas and/or antenna ports) as well as one more reduced-power CSI-RS transmit power configurations (e.g., a configuration in which the network entity 110 transmits using less than all available antennas and/or antenna ports). In some aspects, each of the multiple CSI-RS transmit power configurations may be associated with a corresponding CSI-RS resource set. That is, the network entity 110 may configure the UE 120 with a separate CSI-RS resource set to be used to determine CSI for each transmit CSI-RS transmit power configuration. In such aspects, when determining the CSI for each of the multiple CSI-RS transmit power configurations, the UE 120 may be configured to assume that a constant CSI-RS transmit power will be used to transmit within each CSI-RS resource within the corresponding CSI-RS resource set.

As shown by reference number 625, the UE 120 may transmit, to the network entity 110, the CSI report (e.g., the UE 120 may transmit, to the network entity 110, the CSI report associated with the multiple CSI-RS transmit power configurations). Moreover, in some aspects, the CSI report may be associated with at least one CSI processing parameter that is based at least in part on the multiple CSI-RS transmit power configurations. For example, the CSI report may be based at least in part on the number of CPUs associated with the CSI report and/or number of simultaneously active CSI-RS resources associated with the CSI report, as described above in connection with reference number 615.

In some aspects, transmitting the CSI report to the network entity 110 may include the UE 120 dropping reporting of CSI associated with at least one of the multiple CSI-RS transmit power configurations based at least in part on the number of CPUs associated with the CSI report exceeding a threshold number of CPUs. For example, as described in connection with FIG. 5, in some aspects, a determined number of CPUs associated with a CSI report (e.g., L) may exceed a threshold number of CPUs associated with the UE 120 (e.g., $N_{CPU}$). Accordingly, in some aspects, the UE 120 may not report any new CSI associated with at least one of the multiple CSI-RS transmit power configurations based at least in part on the number of CPUs associated with the CSI report exceeding a threshold number of CPUs, but rather may report previous and/or outdated CSI. Put another way, if determining CSI associated with a certain CSI-RS transmit power configuration would increase a number of CPUs (e.g., L) to exceed a threshold number of CPUs (e.g., $N_{CPU}$), the UE 120 may not determine the CSI associated with the corresponding CSI-RS transmit power configuration and instead send a previous and/or outdated CSI associated with the corresponding CSI-RS transmit power configuration.

Moreover, in some aspects, the UE 120 may be configured with information indicating which CSI should be dropped in such a situation. For example, the UE 120 may receive configuration information from the network entity 110 (e.g., as part of the configuration information described in connection with reference number 610, or as part of a different configuration message such as via another RRC message received from the network entity 110) that indicates the at least one of the multiple CSI-RS transmit power configurations for which the reporting of CSI should be dropped. For example, the configuration information may indicate that reporting for one or more reduced-power CSI-RS transmit power configurations should be dropped, but that reporting for the full-power CSI-RS transmit power configuration should not be dropped. In this way, the network entity 110 may receive CSI for each potential CSI-RS transmit power configuration when the UE 120 has the resources to provide such CSI, yet the network entity 110 may be able to flexibly adjust reporting procedures when the configured CSI report exceeds the UE 120's capabilities.

As indicated above, FIG. 6 is provided as an example. Other examples may differ from what is described with respect to FIG. 6.

Figure 7:
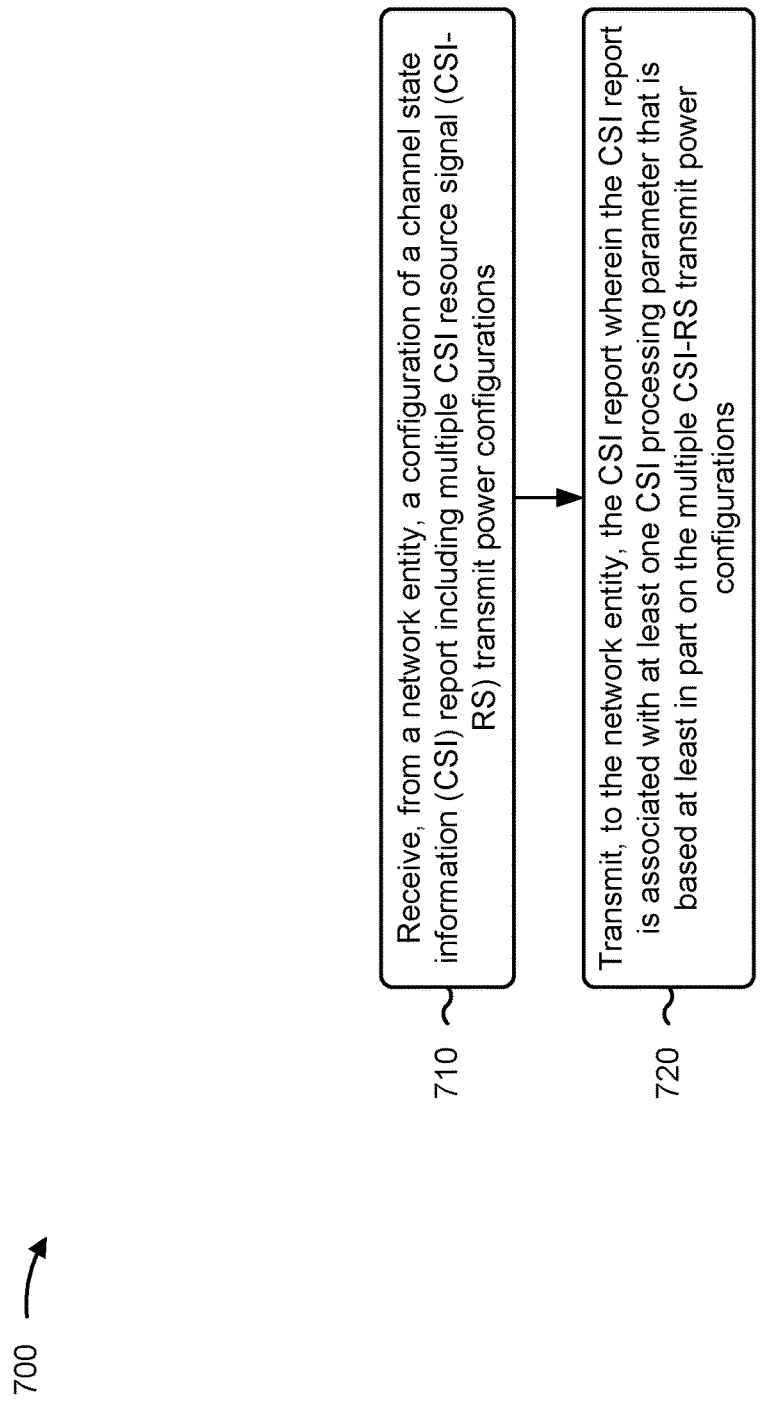
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with CSI processing parameters associated with multiple CSI-RS transmit power configurations.

As shown in FIG. 7, in some aspects, process 700 may include receiving, from a network entity, a CSI report configuration including multiple CSI-RS transmit power configurations (block 710). For example, the UE (e.g., using communication manager 908 and/or reception component 902, depicted in FIG. 9) may receive, from a network entity (e.g., network entity 110), a CSI report configuration including multiple CSI-RS transmit power configurations, as described above.

As further shown in FIG. 7, in some aspects, process 700 may include transmitting, to the network entity, the CSI report, wherein the CSI report is associated with at least one CSI processing parameter that is based at least in part on the multiple CSI-RS transmit power configurations (block 720). For example, the UE (e.g., using communication manager 908 and/or transmission component 904, depicted in FIG. 9)

may transmit, to the network entity, the CSI report, wherein the CSI report is associated with at least one CSI processing parameter that is based at least in part on the multiple CSI-RS transmit power configurations, as described above.

Process 700 may include additional aspects, such as any single aspect or any combination of aspects described below and/or in connection with one or more other processes described elsewhere herein.

In a first aspect, the at least one CSI processing parameter includes a number of CPUs associated with the CSI report.

In a second aspect, alone or in combination with the first aspect, the number of CPUs associated with the CSI report is based at least in part on a number of configured CSI-RS resources and a number of the multiple CSI-RS transmit power configurations.

In a third aspect, alone or in combination with one or more of the first and second aspects, the number of CPUs associated with the CSI report is based at least in part on a product of the number of the configured CSI-RS resources and the number of the multiple CSI-RS transmit power configurations.

In a fourth aspect, alone or in combination with one or more of the first through third aspects, the number of CPUs associated with the CSI report is based at least in part on a CPU scaling factor associated with the product of the number of the configured CSI-RS resources and the number of the multiple CSI-RS transmit power configurations.

In a fifth aspect, alone or in combination with one or more of the first through fourth aspects, the CPU scaling factor is less than or equal to one.

In a sixth aspect, alone or in combination with one or more of the first through fifth aspects, each of the multiple CSI-RS transmit power configurations is associated with a corresponding CSI-RS resource set, and CSI for each of the multiple CSI-RS transmit power configurations is based at least in part on a constant CSI-RS transmit power for each CSI-RS resource within the corresponding CSI-RS resource set.

In a seventh aspect, alone or in combination with one or more of the first through sixth aspects, process 700 includes dropping reporting of CSI associated with at least one of the multiple CSI-RS transmit power configurations based at least in part on the number of CPUs associated with the CSI report exceeding a threshold number of CPUs.

In an eighth aspect, alone or in combination with one or more of the first through seventh aspects, process 700 includes receiving a configuration indicating the at least one of the multiple CSI-RS transmit power configurations for which the reporting of CSI should be dropped.

In a ninth aspect, alone or in combination with one or more of the first through eighth aspects, the configuration indicating the at least one of the multiple CSI-RS transmit power configurations for which the reporting of CSI should be dropped is received via a radio resource control message.

In a tenth aspect, alone or in combination with one or more of the first through ninth aspects, the at least one CSI processing parameter includes a number of simultaneously active CSI-RS resources associated with the CSI report.

In an eleventh aspect, alone or in combination with one or more of the first through tenth aspects, the at least one CSI processing parameter further includes a number of ports associated with the number of simultaneously active CSI-RS resources associated with the CSI report.

In a twelfth aspect, alone or in combination with one or more of the first through eleventh aspects, the number of simultaneously active CSI-RS resources associated with the CSI report is based at least in part on a number of the multiple CSI-RS transmit power configurations.

In a thirteenth aspect, alone or in combination with one or more of the first through twelfth aspects, the number of simultaneously active CSI-RS resources associated with the CSI report is based at least in part on a resource counting scaling factor associated with a number of the multiple CSI-RS transmit power configurations.

In a fourteenth aspect, alone or in combination with one or more of the first through thirteenth aspects, the resource counting scaling factor is less than or equal to one.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
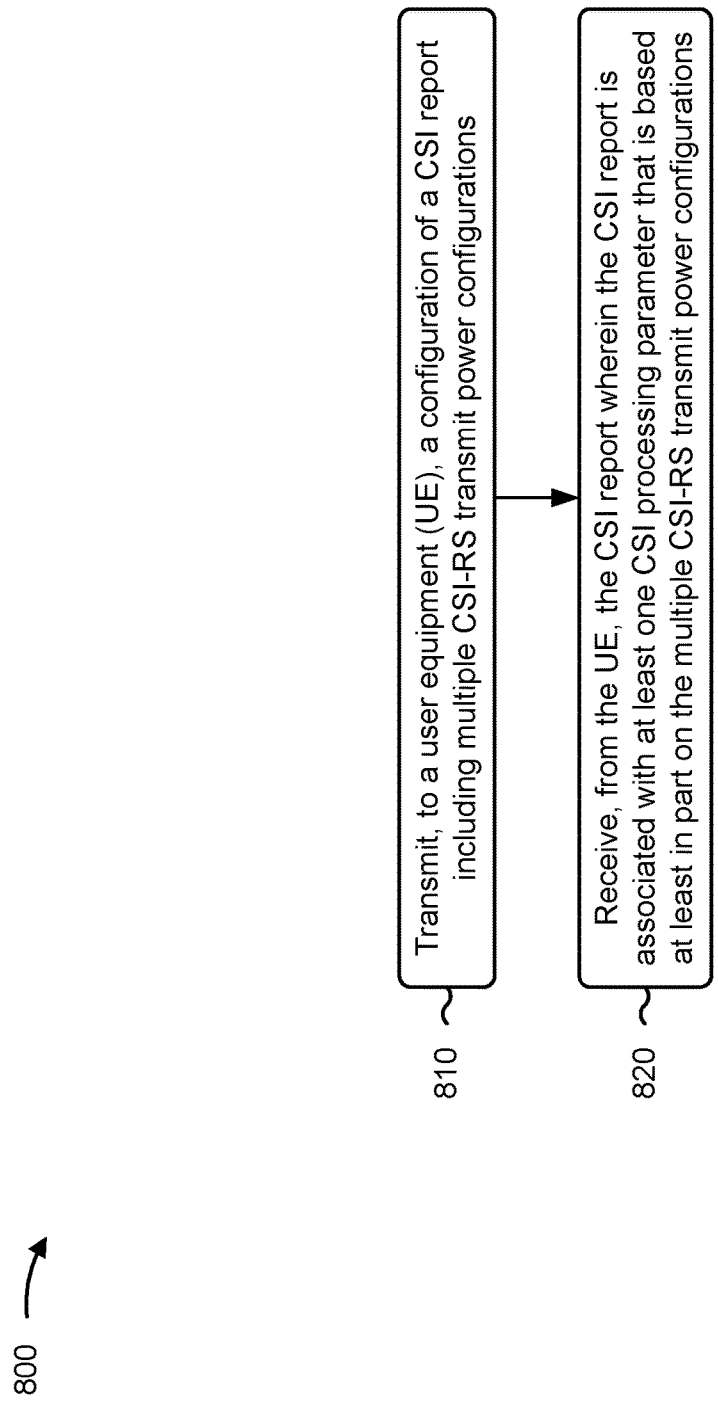
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., network entity 110) performs operations associated with channel state information processing parameters associated with multiple CSI-RS transmit power configurations.

As shown in FIG. 8, in some aspects, process 800 may include transmitting, to a UE (e.g., UE 120), a CSI report configuration including multiple CSI-RS transmit power configurations (block 810). For example, the network entity (e.g., using communication manager 1008, transmission component 1004, and/or configuration component 1010 depicted in FIG. 10) may transmit, to a UE, a CSI report configuration including multiple CSI-RS transmit power configurations, as described above.

As further shown in FIG. 8, in some aspects, process 800 may include receiving, from the UE, the CSI report, wherein the CSI report is associated with at least one CSI processing parameter that is based at least in part on the multiple CSI-RS transmit power configurations (block 820). For example, the network entity (e.g., using communication manager 1008 and/or reception component 1002, depicted in FIG. 10) may receive, from the UE, the CSI report, wherein the CSI report is associated with at least one CSI processing parameter that is based at least in part on the multiple CSI-RS transmit power configurations, as described above.

Process 800 may include additional aspects, such as any single aspect or any combination of aspects described below and/or in connection with one or more other processes described elsewhere herein.

In a first aspect, the at least one CSI processing parameter includes a number of CPUs associated with the CSI report.

In a second aspect, alone or in combination with the first aspect, the number of CPUs associated with the CSI report is based at least in part on a number of configured CSI-RS resources and a number of the multiple CSI-RS transmit power configurations.

In a third aspect, alone or in combination with one or more of the first and second aspects, the number of CPUs associated with the CSI report is based at least in part on a product of the number of the configured CSI-RS resources and the number of the multiple CSI-RS transmit power configurations.

In a fourth aspect, alone or in combination with one or more of the first through third aspects, the number of CPUs associated with the CSI report is based at least in part on a CPU scaling factor associated with the product of the number of the configured CSI-RS resources and the number of the multiple CSI-RS transmit power configurations.

In a fifth aspect, alone or in combination with one or more of the first through fourth aspects, the CPU scaling factor is less than or equal to one.

In a sixth aspect, alone or in combination with one or more of the first through fifth aspects, process 800 includes transmitting, to the UE, a configuration indicating at least one of the multiple CSI-RS transmit power configurations for which the reporting of CSI should be dropped based at least in part on a number of CPUs associated with the CSI report exceeding a threshold number of CPUs.

In a seventh aspect, alone or in combination with one or more of the first through sixth aspects, the configuration indicating the at least one of the multiple CSI-RS transmit power configurations for which the reporting of CSI should be dropped is transmitted via a radio resource control message.

In an eighth aspect, alone or in combination with one or more of the first through seventh aspects, the at least one CSI processing parameter includes a number of simultaneously active CSI-RS resources associated with the CSI report.

In a ninth aspect, alone or in combination with one or more of the first through eighth aspects, the at least one CSI processing parameter further includes a number of ports associated with the number of simultaneously active CSI-RS resources associated with the CSI report.

In a tenth aspect, alone or in combination with one or more of the first through ninth aspects, the number of simultaneously active CSI-RS resources associated with the CSI report is based at least in part on a number of the multiple CSI-RS transmit power configurations.

In an eleventh aspect, alone or in combination with one or more of the first through tenth aspects, the number of simultaneously active CSI-RS resources associated with the CSI report is based at least in part on a resource counting scaling factor associated with a number of the multiple CSI-RS transmit power configurations.

In a twelfth aspect, alone or in combination with one or more of the first through eleventh aspects, the resource counting scaling factor is less than or equal to one.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
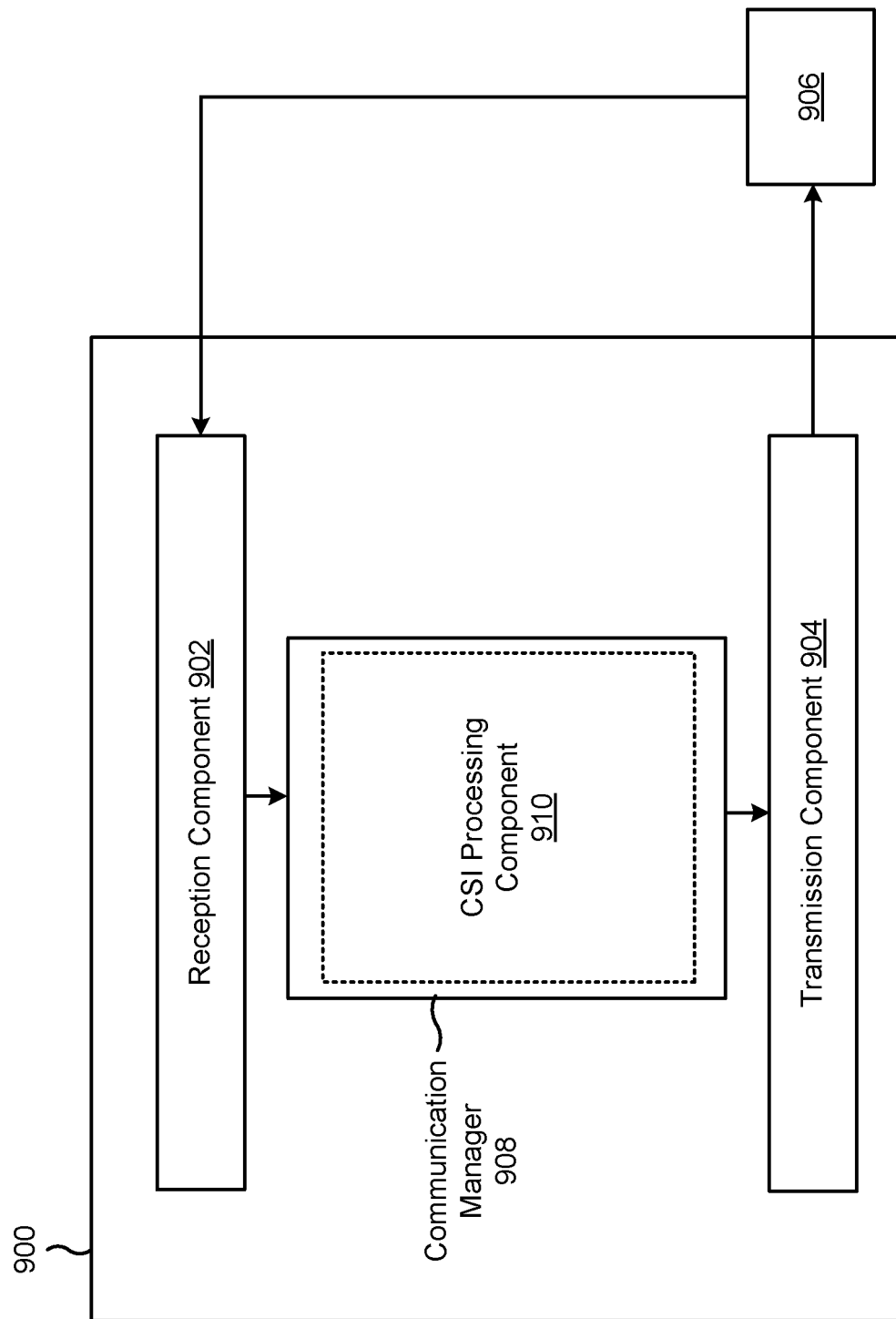
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 120), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 140). The communication manager 908 may include a CSI processing component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The reception component 902 may receive, from a network entity, a CSI report configuration including multiple CSI-RS transmit power configurations. The transmission component 904 may transmit, to the network entity, the CSI report, wherein the CSI report is associated with at least one CSI processing parameter that is based at least in part on the multiple CSI-RS transmit power configurations.

The CSI processing component 910 may determine CSI for each of the multiple CSI-RS transmit power configurations, wherein each of the multiple CSI-RS transmit power configurations is associated with a corresponding CSI-RS resource set, and wherein determining the CSI for each of the multiple CSI-RS transmit power configurations is based at least in part on assuming a constant CSI-RS transmit power for each CSI-RS resource within the corresponding CSI-RS resource set.

The CSI processing component 910 may drop reporting of CSI associated with at least one of the multiple CSI-RS transmit power configurations based at least in part on the number of CPUs associated with the CSI report exceeding a threshold number of CPUs.

The reception component 902 may receive a configuration indicating the at least one of the multiple CSI-RS transmit power configurations for which the reporting of CSI should be dropped.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
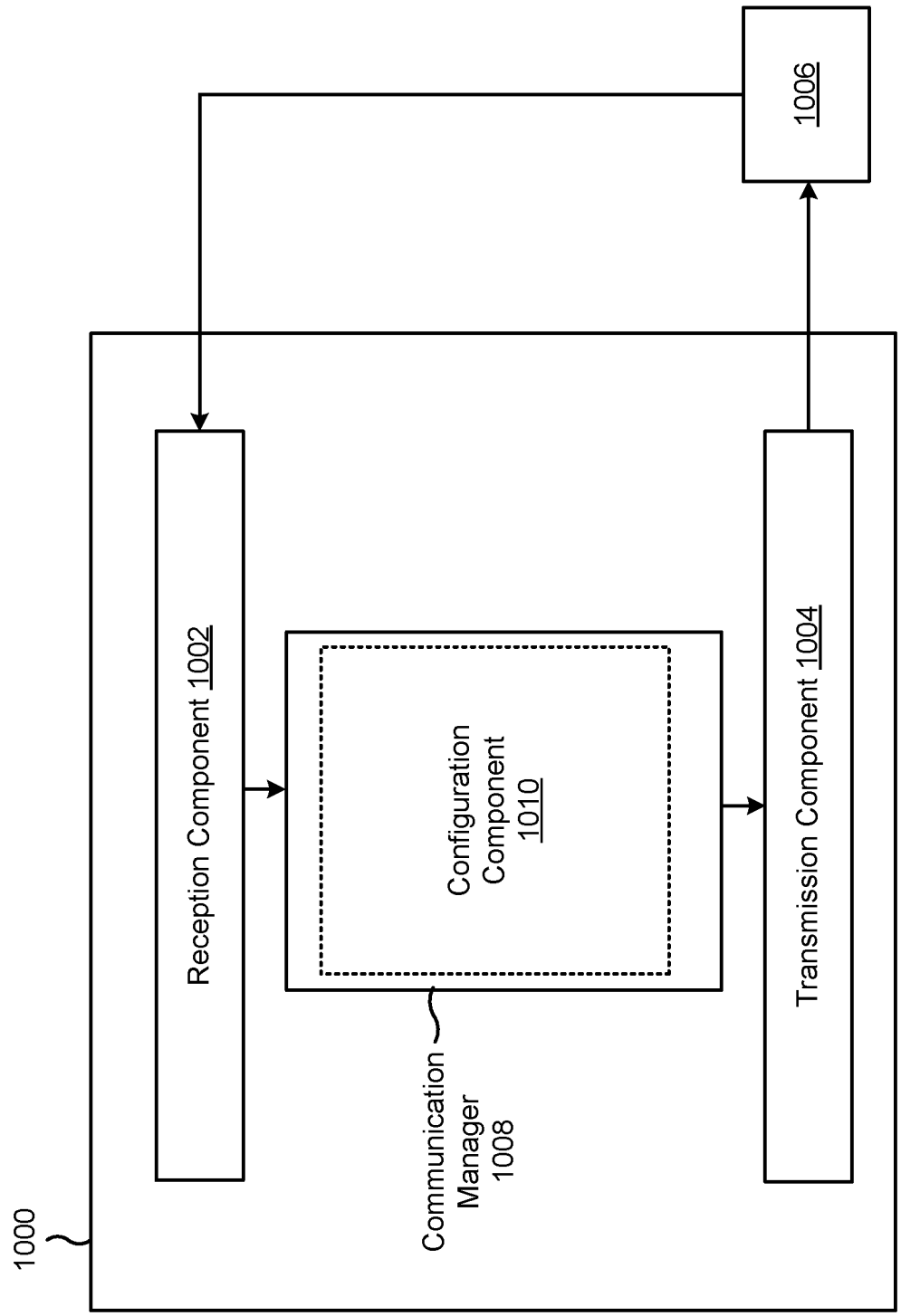
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network entity (e.g., network entity 110), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 150). The communication manager 1008 may include a configuration component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity 110 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity 110 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity 110 described in connection with FIG. 2. In some aspects, the transmission component 1004 may be co-located with the reception component 1002 in a transceiver.

The transmission component 1004 and/or the configuration component 1010 may transmit, to a UE, a CSI report configuration including multiple CSI-RS transmit power configurations. The reception component 1002 may receive, from the UE, the CSI report, wherein the CSI report is associated with at least one CSI processing parameter that is based at least in part on the multiple CSI-RS transmit power configurations.

The transmission component 1004 and/or the configuration component 1010 may transmit, to the UE, a configuration indicating at least one of the multiple CSI-RS transmit power configurations for which the reporting of CSI should be dropped based at least in part on a number of CPUs associated with the CSI report exceeding a threshold number of CPUs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network entity, a CSI report configuration including multiple CSI-RS transmit power configurations; and transmitting, to the network entity, the CSI report, wherein the CSI report is associated with at least one CSI processing parameter that is based at least in part on the multiple CSI-RS transmit power configurations.

Aspect 2: The method of Aspect 1, wherein the at least one CSI processing parameter includes a number of CPUs associated with the CSI report.

Aspect 3: The method of Aspect 2, wherein the number of CPUs associated with the CSI report is based at least in part on a number of configured CSI-RS resources and a number of the multiple CSI-RS transmit power configurations.

Aspect 4: The method of Aspect 3, wherein the number of CPUs associated with the CSI report is based at least in part on a product of the number of the configured CSI-RS resources and the number of the multiple CSI-RS transmit power configurations.

Aspect 5: The method of Aspect 4, wherein the number of CPUs associated with the CSI report is based at least in part on a CPU scaling factor associated with the product of the number of the configured CSI-RS resources and the number of the multiple CSI-RS transmit power configurations.

Aspect 6: The method of Aspect 5, wherein the CPU scaling factor is less than or equal to one.

Aspect 7: The method of any of Aspects 2-6, wherein each of the multiple CSI-RS transmit power configurations is associated with a corresponding CSI-RS resource set, and wherein CSI for each of the multiple CSI-RS transmit power configurations is based at least in part on a constant CSI-RS transmit power for each CSI-RS resource within the corresponding CSI-RS resource set.

Aspect 8: The method of any of Aspects 2-7, further comprising dropping reporting of CSI associated with at least one of the multiple CSI-RS transmit power configurations based at least in part on the number of CPUs associated with the CSI report exceeding a threshold number of CPUs.

Aspect 9: The method of Aspect 8, further comprising receiving a configuration indicating the at least one of the multiple CSI-RS transmit power configurations for which the reporting of CSI should be dropped.

Aspect 10: The method of Aspect 9, wherein the configuration indicating the at least one of the multiple CSI-RS transmit power configurations for which the reporting of CSI should be dropped is received via a radio resource control message.

Aspect 11: The method of any of Aspects 1-10, wherein the at least one CSI processing parameter includes a number of simultaneously active CSI-RS resources associated with the CSI report.

Aspect 12: The method of Aspect 11, wherein the at least one CSI processing parameter further includes a number of ports associated with the number of simultaneously active CSI-RS resources associated with the CSI report.

Aspect 13: The method of any of Aspects 11-12, wherein the number of simultaneously active CSI-RS resources associated with the CSI report is based at least in part on a number of the multiple CSI-RS transmit power configurations.

Aspect 14: The method of Aspect 13, wherein the number of simultaneously active CSI-RS resources associated with the CSI report is based at least in part on a resource counting scaling factor associated with a number of the multiple CSI-RS transmit power configurations.

Aspect 15: The method of Aspect 14, wherein the resource counting scaling factor is less than or equal to one.

Aspect 16: A method of wireless communication performed by a network entity, comprising: transmitting, to a UE, a CSI report configuration including multiple CSI-RS transmit power configurations; and receiving, from the UE, the CSI report, wherein the CSI report is associated with at least one CSI processing parameter that is based at least in part on the multiple CSI-RS transmit power configurations.

Aspect 17: The method of Aspect 16, wherein the at least one CSI processing parameter includes a number of CPUs associated with the CSI report.

Aspect 18: The method of Aspect 17, wherein the number of CPUs associated with the CSI report is based at least in part on a number of configured CSI-RS resources and a number of the multiple CSI-RS transmit power configurations.

Aspect 19: The method of Aspect 18, wherein the number of CPUs associated with the CSI report is based at least in part on a product of the number of the configured CSI-RS resources and the number of the multiple CSI-RS transmit power configurations.

Aspect 20: The method of Aspect 19, wherein the number of CPUs associated with the CSI report is based at least in part on a CPU scaling factor associated with the product of the number of the configured CSI-RS resources and the number of the multiple CSI-RS transmit power configurations.

Aspect 21: The method of Aspect 20, wherein the CPU scaling factor is less than or equal to one.

Aspect 22: The method of any of Aspects 17-21, further comprising transmitting, to the UE, a configuration indicating at least one of the multiple CSI-RS transmit power configurations for which the reporting of CSI should be dropped based at least in part on a number of CPUs associated with the CSI report exceeding a threshold number of CPUs.

Aspect 23: The method of Aspect 22, wherein the configuration indicating the at least one of the multiple CSI-RS transmit power configurations for which the reporting of CSI should be dropped is transmitted via a radio resource control message.

Aspect 24: The method of any of Aspects 16-23, wherein the at least one CSI processing parameter includes a number of simultaneously active CSI-RS resources associated with the CSI report.

Aspect 25: The method of Aspect 24, wherein the at least one CSI processing parameter further includes a number of ports associated with the number of simultaneously active CSI-RS resources associated with the CSI report.

Aspect 26: The method of any of Aspects 24-25, wherein the number of simultaneously active CSI-RS resources associated with the CSI report is based at least in part on a number of the multiple CSI-RS transmit power configurations.

Aspect 27: The method of Aspect 26, wherein the number of simultaneously active CSI-RS resources associated with the CSI report is based at least in part on a resource counting scaling factor associated with a number of the multiple CSI-RS transmit power configurations.

Aspect 28: The method of Aspect 27, wherein the resource counting scaling factor is less than or equal to one.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a network entity, a channel state information (CSI) report configuration including multiple CSI reference signal (CSI-RS) transmit power configurations; and
      transmit, to the network entity, the CSI report,
         wherein the CSI report is associated with at least one CSI processing parameter that is based at least in part on the multiple CSI-RS transmit power configurations, and
         wherein the at least one CSI processing parameter includes a number of simultaneously active CSI-RS resources associated with the CSI report.

2. The apparatus of claim 1, wherein the at least one CSI processing parameter includes a number of CSI processing units (CPUs) associated with the CSI report.

3. The apparatus of claim 2, wherein the number of CPUs associated with the CSI report is based at least in part on a number of configured CSI-RS resources and a number of the multiple CSI-RS transmit power configurations.

4. The apparatus of claim 3, wherein the number of CPUs associated with the CSI report is based at least in part on a product of the number of the configured CSI-RS resources and the number of the multiple CSI-RS transmit power configurations.

5. The apparatus of claim 4, wherein the number of CPUs associated with the CSI report is based at least in part on a CPU scaling factor associated with the product of the number of the configured CSI-RS resources and the number of the multiple CSI-RS transmit power configurations.

6. The apparatus of claim 5, wherein the CPU scaling factor is less than or equal to one.

7. The apparatus of claim 2, wherein each of the multiple CSI-RS transmit power configurations is associated with a corresponding CSI-RS resource set, and
wherein CSI for each of the multiple CSI-RS transmit power configurations is based at least in part on a constant CSI-RS transmit power for each CSI-RS resource within the corresponding CSI-RS resource set.

8. The apparatus of claim 2, wherein the one or more processors are further configured to drop reporting of CSI associated with at least one of the multiple CSI-RS transmit power configurations based at least in part on the number of CPUs associated with the CSI report exceeding a threshold number of CPUs.

9. The apparatus of claim 8, wherein the one or more processors are further configured to receive a configuration indicating the at least one of the multiple CSI-RS transmit power configurations for which the reporting of CSI should be dropped.

10. The apparatus of claim 9, wherein the configuration indicating the at least one of the multiple CSI-RS transmit power configurations for which the reporting of CSI should be dropped is received via a radio resource control message.

11. The apparatus of claim 1, wherein the at least one CSI processing parameter further includes a number of ports associated with the number of simultaneously active CSI-RS resources associated with the CSI report.

12. The apparatus of claim 1, wherein the number of simultaneously active CSI-RS resources associated with the CSI report is based at least in part on a number of the multiple CSI-RS transmit power configurations.

13. The apparatus of claim 1, wherein the number of simultaneously active CSI-RS resources associated with the CSI report is based at least in part on a resource counting scaling factor associated with a number of the multiple CSI-RS transmit power configurations.

14. The apparatus of claim 13, wherein the resource counting scaling factor is less than or equal to one.

15. An apparatus for wireless communication at a network entity, comprising:
one or more memories; and
one or more processors, coupled to the one or more memories, configured to:
transmit, to a user equipment (UE), a channel state information (CSI) report configuration including multiple CSI reference signal (CSI-RS) transmit power configurations; and
receive, from the UE, the CSI report,
wherein the CSI report is associated with at least one CSI processing parameter that is based at least in part on the multiple CSI-RS transmit power configurations, and
wherein the at least one CSI processing parameter includes a number of simultaneously active CSI-RS resources associated with the CSI report.

16. The apparatus of claim 15, wherein the at least one CSI processing parameter includes a number of CSI processing units (CPUs) associated with the CSI report.

17. The apparatus of claim 16, wherein the number of CPUs associated with the CSI report is based at least in part on a product of a number of configured CSI-RS resources and a number of the multiple CSI-RS transmit power configurations.

18. The apparatus of claim 17, wherein the number of CPUs associated with the CSI report is based at least in part on a CPU scaling factor associated with the product of the number of the configured CSI-RS resources and the number of the multiple CSI-RS transmit power configurations.

19. The apparatus of claim 16, wherein the one or more processors are further configured to transmit, to the UE, a configuration indicating at least one of the multiple CSI-RS transmit power configurations for which reporting of CSI should be dropped based at least in part on the number of CPUs associated with the CSI report exceeding a threshold number of CPUs.

20. The apparatus of claim 15, wherein the number of simultaneously active CSI-RS resources associated with the CSI report is based at least in part on a number of the multiple CSI-RS transmit power configurations.

21. The apparatus of claim 15, wherein the number of simultaneously active CSI-RS resources associated with the CSI report is based at least in part on a resource counting scaling factor associated with a number of the multiple CSI-RS transmit power configurations.

22. The apparatus of claim 21, wherein the resource counting scaling factor is less than or equal to one.

23. A method of wireless communication performed by a user equipment (UE), comprising:
receiving, from a network entity, a channel state information (CSI) report configuration including multiple CSI reference signal (CSI-RS) transmit power configurations;
transmitting, to the network entity, the CSI report,
wherein the CSI report is associated with at least one CSI processing parameter that is based at least in part on the multiple CSI-RS transmit power configurations, and
wherein the at least one CSI processing parameter includes a number of CSI processing units (CPUs) associated with the CSI report; and
dropping reporting of CSI associated with at least one of the multiple CSI-RS transmit power configurations based at least in part on the number of CPUs associated with the CSI report exceeding a threshold number of CPUs.

24. The method of claim 23, wherein each of the multiple CSI-RS transmit power configurations is associated with a corresponding CSI-RS resource set, and
wherein CSI for each of the multiple CSI-RS transmit power configurations is based at least in part on a constant CSI-RS transmit power for each CSI-RS resource within the corresponding CSI-RS resource set.

25. The method of claim 23, wherein the at least one CSI processing parameter includes a number of simultaneously active CSI-RS resources associated with the CSI report.

26. A method of wireless communication performed by a network entity, comprising:
transmitting, to a user equipment (UE), a channel state information (CSI) report configuration including multiple CSI reference signal (CSI-RS) transmit power configurations;
receiving, from the UE, the CSI report,
wherein the CSI report is associated with at least one CSI processing parameter that is based at least in part on the multiple CSI-RS transmit power configurations, and
wherein the at least one CSI processing parameter includes a number of CSI processing units (CPUs) associated with the CSI report; and transmitting, to the UE, a configuration indicating at least one of the multiple CSI-RS transmit power configurations for which reporting of CSI should be dropped based at least in part on the number of CPUs associated with the CSI report exceeding a threshold number of CPUs.

27. The apparatus of claim 1, wherein the multiple CSI-RS transmit power configurations include:
  a first CS-RS transmit power configuration corresponding to a first transmission using a first quantity of at least one of antenna panels or ports, and
  a second CSI-RS transmit power configuration corresponding to a second transmission using a second quantity of the at least one of antenna panels or ports.

28. The apparatus of claim 15, wherein the at least one CSI processing parameter further includes a number of ports associated with the number of simultaneously active CSI-RS resources associated with the CSI report.

29. The method of claim 23, further comprising:
  receiving a configuration indicating the at least one of the multiple CSI-RS transmit power configurations for which the reporting of CSI should be dropped.

30. The method of claim 29, wherein the configuration indicating the at least one of the multiple CSI-RS transmit power configurations for which the reporting of CSI should be dropped is received via a radio resource control message.

* * * * *